United States Patent [19]

Sebo

[11] Patent Number: 4,691,737
[45] Date of Patent: Sep. 8, 1987

[54] BRAKE CONTROL VALVE

[75] Inventor: Milan J. Sebo, Lorain, Ohio

[73] Assignee: Allied Corporation, Morristown, N.J.

[21] Appl. No.: 679,781

[22] Filed: Dec. 10, 1984

[51] Int. Cl.⁴ .............................................. F15B 13/04
[52] U.S. Cl. ............................ 137/625.26; 137/625.49
[58] Field of Search ........................ 137/625.26, 625.49

[56] References Cited

U.S. PATENT DOCUMENTS

| Re. 25,969 | 3/1966 | Valentine | 303/29 |
|---|---|---|---|
| 2,655,936 | 10/1953 | Wexler et al. | 137/540 |
| 2,841,429 | 7/1958 | McCuistion | 288/19 |
| 3,165,120 | 1/1965 | Horowitz | 137/625.49 X |
| 4,072,161 | 2/1978 | Schoeneweis et al. | 137/68 R |
| 4,076,328 | 2/1978 | Horowitz | 137/625.27 X |
| 4,223,697 | 9/1980 | Pendleton | 137/527.8 |
| 4,258,925 | 3/1981 | Guyton | 277/29 |
| 4,345,739 | 8/1982 | Wheatley | 251/358 |
| 4,356,998 | 11/1982 | Bach et al. | 251/354 |
| 4,408,632 | 10/1983 | Kent | 137/516.29 |

Primary Examiner—Gerald A. Michalsky
Attorney, Agent, or Firm—Ken C. Decker; William N. Antonis

[57] ABSTRACT

A control valve for a vehicle fluid pressure braking system includes a housing having an inlet port, an outlet port and a delivery port. A plunger is movable in the housing to control communication between the ports. The plunger is provided with a shoulder which carries a sealing member which engages with a seating area on the housing to provide a seal controlling communication between the aforementioned ports. The seal includes a circumferentially extending cavity on the housing in which the body portion of the seal is received. A pair of beads project from the body portion of the seal in opposite axial directions, so that when the seal is moved into engagement with the seating surface, one of the beads sealingly engages the sealing surface, and the axial direction forces generated thereby force the bead on the opposite side of the seal into sealing engagement with a sealing surface on the plunger. When the plunger is moved away from the seating surface, thereby abruptly reducing the pressure level around the plunger, high pressure air which is trapped in the groove receiving the body portion of the seal may escape by deflecting the bead away from the sealing surface on the plunger, thereby preventing the high pressure fluid from forcing the seal from the groove.

14 Claims, 2 Drawing Figures

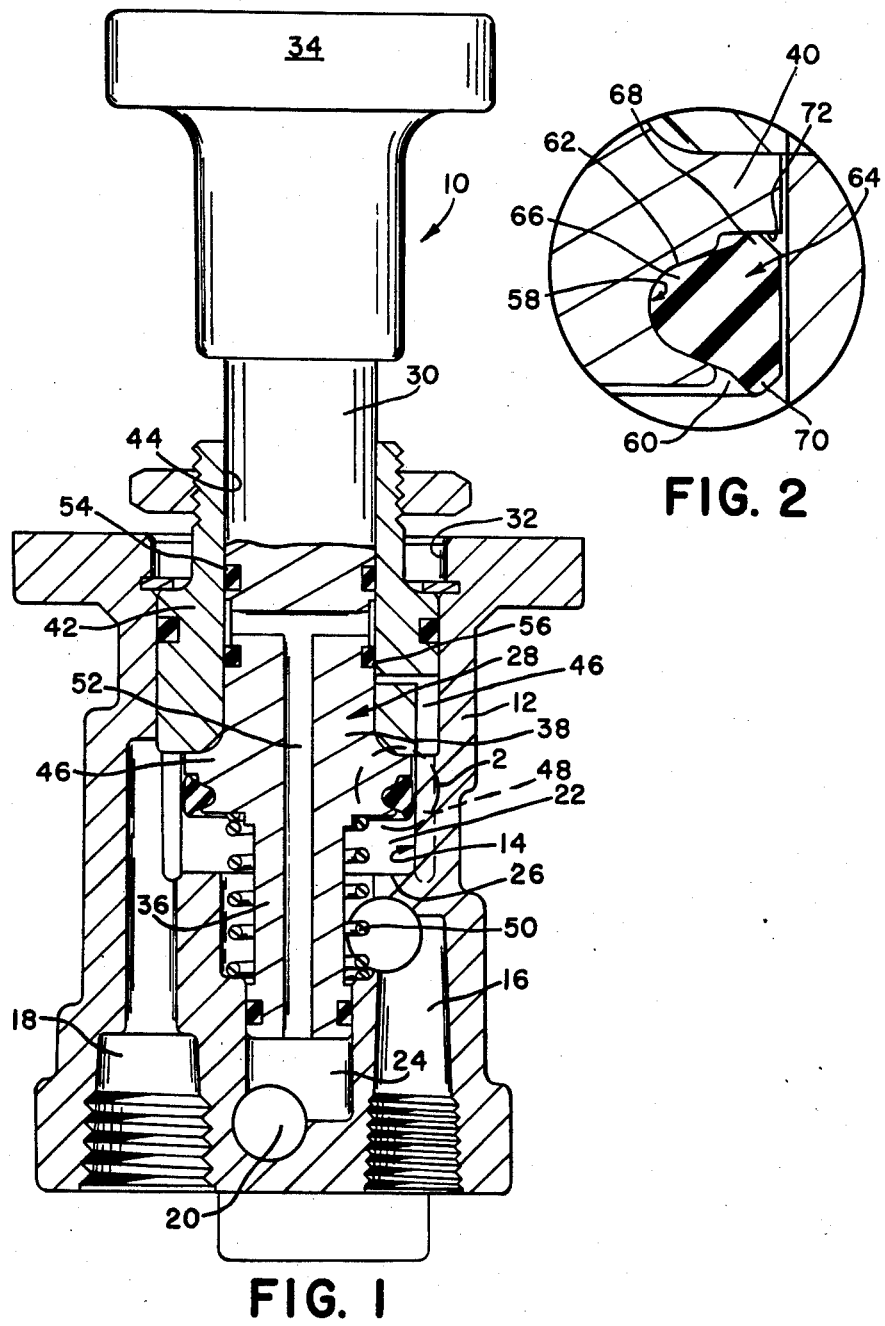

BRAKE CONTROL VALVE

This invention relates to a control valve for a vehicle fluid pressure braking system.

Heavy duty vehicles are normally equipped with air brakes. These air brake systems normally include spring-applied, pressure-released parking emergency brakes (hereinafter referred to as "spring brakes") which are controlled by control valves mounted on the vehicle dashboard. A typical valve of this type is disclosed in U.S. Pat. No. RE 25,969. This type of valve automatically moves to a position venting the hold-off pressure communicated to the spring brakes when the pressure in the braking system drops below a predetermined level, or may be actuated manually when the vehicle is parked to set the spring brakes. Because the pressure within the valve rapidly changes from a very high pressure level to a very low pressure level when the valve is operated, the sealing mechanism within prior art valves of this type is rather complex and expensive.

The present invention provides a less expensive valve in which a relatively simple elastic sealing member is disposed in a relatively simple groove in the valve operating plunger. The valve has also been designed so that it may be manufactured from a relatively inexpensive, non-metallic material, such as plastic.

In valves using elastomeric or elastic seals received in grooves, high pressure tends to migrate into the groove when the seal is disposed in a high pressure environment. When the high pressure is abruptly reduced, the high pressure in the groove behind the seal cannot easily vent. Accordingly, the high pressure differential between the low pressure on one side of the seal and the relatively high pressure in the groove forces the seals out of their grooves.

Accordingly, the present invention is characterized by a sealing arrangement which includes a groove on a plunger, a seal made from an elastic material having a body portion received in the groove, the seal being maintained in said groove by the elasticity of the seal, the seal including a portion projecting from said groove for engagement with a valve seating surface on said housing.

The seal is further characterized in that it includes a circumferentially extending bead projecting from the body portion of the seal and engaging a sealing surface defined in the groove, so that when the seal is applied to its sealing surfaces, beads on opposite sides of the body of the seal engage respectively the sealing surface on the wall of the housing of the valve and the sealing surface on the groove, but when the valve is released, the high pressure of fluid in the groove receiving the seal can deflect the bead engaged with the sealing surface on the plunger to thereby provide a vent for the high pressure in the groove. Since the high pressure of the groove can vent to the low pressure area, there is no pressure differential tending to force the seal out of the groove.

Accordingly, the present invention has the advantage of providing a simplified and more effective sealing mechanism than those available in the prior art, thereby reducing the cost and increasing the reliability of brake control valves of the type disclosed herein. Another advantage of the present invention is that the simplified sealing structure disclosed herein enables the body of the valve to be made from non-metallic or plastic materials, thereby further reducing the cost of the valve.

These and other advantages of the present invention will become apparent from the following specification with reference to the accompanying drawings, in which:

FIG. 1 is a longitudinal cross-sectional view of a brake control valve made pursuant to the teachings of the present invention; and FIG. 2 is an enlargement of the circumscribed portion of FIG. 1.

Referring now to the drawings, a brake control valve generally indicated by the numeral 10 includes a housing 12 defining a bore 14 therewithin. The bore 14 communicates with an exhaust port 16 which communicates with ambient atmosphere. The bore 14 also communicates with an outlet or delivery port 18, and an inlet or supply port 20. The bore 14 is stepped to define a larger diameter portion 22 and a smaller diameter portion 24 which cooperate to define a circumferentially extending shoulder 26 therebetween. The shoulder 26 defines a valve seating area as will hereinafter be explained.

A plunger generally indicated by the numeral 28 is slidably received in the bore 14 and includes a stem 30 projecting from the end 32 of the housing 12. A knob 34 is installed on the end of the stem 30 for operation by the vehicle operator in the conventional manner. The plunger is stepped to define a smaller diameter portion 36 and a larger diameter portion 38 with a shoulder 40 therebetween. A fitting 42 closes the opened end 32 of the housing 12 and is provided with an opening 44 through which the stem 30 extends. A portion of the fitting 42 is cut away to define a chamber 46 which communicates with the larger portion 22 of the bore 14 through a passage 48 indicated by dashed lines in FIG. 1. A spring 50 bears against the shoulder 40 and yieldably urges the plunger 28 upwardly viewing FIG. 1, to the position illustrated. A passage 52 extends through the plunger 28 and communicates with the circumferential portion of the plunger 28 in an area isolated between conventional O-ring seals 54, 56.

Referring to the detail illustrated in FIG. 2, the shoulder 40 of the plunger 28 is cut away to define a circumferentially extending groove generally indicated by the numeral 58. The groove 58 is provided with a circumferentially extending opening 60 in the shoulder 40 and a recessed cavity generally indicated by the numeral 62. An elastomeric seal generally indicated by the numeral 64 has a body portion 66 which is compatible in shape with the cavity 62 and projects therefrom into the rest of the groove 58. A pair of beads 68, 70 project from opposite sides of the body portion 66. The bead 68 is adapted for sealing engagement with a sealing surface 72 defined on the wall of the groove 58, and the bead 70 projects through the circumferentially extending opening 60.

In operation, the various components of the valve 10 are illustrated in the drawings in the positions in which they assume when, for example, the vehicle is parked with the spring brakes applied, so that the hold off pressure is vented from the spring brakes. In this condition, the fluid pressure at the inlet or supply port 20 is sealed off since that portion of the plunger 28 carrying the O-ring seals 54, 56 is received within the opening 44 in the fitting 42, thereby sealing off the passage 52. Since the seal 64 is disposed away from the sealing surface on the shoulder 26, substantially uninhibited fluid communication is permitted between the exhaust port 16 and the outlet or delivery port 18, thereby communicating the hold off pressure in the aforementioned spring brakes through the outlet or delivery port 18 and into the exhaust port 16.

When the vehicle is to be moved, the plunger 28 is moved downwardly, viewing the Figures, by the vehicle operator, thereby forcing the bead 70 on the seal 64 into sealing engagement with the sealing surface defined on the shoulder 26. Engagement of the bead 70 with the seating surface on the shoulder 26 generates an axially directed force which is transmitted through the resiliency of the seal 64 to thereby also form a sealing engagement between the bead 68 and the sealing surface 72. Therefore, communication between the exhaust port 16 and the outlet or delivery port 18 is cut off. Downward movement of the plunger 28 also brings the passage 52 into communication with the compartment 46 which, as discussed above, is communicated with the larger diameter portion 22 of the bore 14. Since the outlet or delivery port 18 is also communicated with the larger diameter portion 22 of the bore 14, communication is thereby permitted between the inlet or supply port 20 and the outlet or delivery port 18, thereby communicating a hold off pressure to the vehicle brakes. Although the spring 50 biases the plunger 28 upwardly, the high fluid pressure level in the bore 14 acting on the unbalanced surfaces of the plunger 28 overcomes the force of the spring 50, so that the seal 64 remains in sealing engagement with the seating surface 26.

It should be noted that, of course, regardless of the integrity of the seal 64, the high fluid pressure in the bore 14 when the seal 64 is in sealing engagement with the seating surface 26 inevitably will migrate into the cavity 62. Due to the sealing engagement of the beads 68 and 70 with their corresponding surfaces, 72, 26, fluid will be trapped in the cavity 62, and, due to the double seal, very little fluid pressure will leak to the exhaust port 16. However, when the vehicle is to be parked and the spring brakes are to be applied, the plunger 28 is pulled upwardly, viewing the Figure, thereby abruptly reducing the fluid pressure level in the larger diameter portion 22 of the bore 14, since the pressure level therein is immediately communicated to the exhaust port 16. In prior art seals used in a similar environment in which high pressure is abruptly reduced to a much lower pressure, the fluid pressure which was inevitably trapped in the cavity 62 could not vent past the seal, so that it had a tendency to force the seal from the cavity, thereby rendering the valve inoperable. However, since upward movement of the plunger 28 eliminates the axial directed force on the beads 68 and 70 which maintain the bead 68 in sealing engagement with the sealing surface 72, the pressure trapped in the upper portion of the cavity 62 viewing the Figure can deflect the bead 68 and escape, while the pressure trapped in the lower portion of the groove can escape through the opening 60. Accordingly, there is no force tending to force the seal from the groove.

As discussed hereinabove, the prior art valves of this type require relatively complicated sealing structures because of the aforementioned problem, which were held on the plunger by bolts. Accordingly, it was not possible to make the plunger out of a non-metallic material, such that valves of this type were more expensive than corresponding valves that could be made out of non-metallic molded material. However, due to the simplified sealing structure disclosed in the present application, no complicated retaining structures are necessary, so that the plunger can now be made out of a non-metallic material, although it is not, of course, necessary for the application of the present invention that it be so made.

I claim:

1. Control valve comprising a housing having an inlet port for communication with a fluid pressure source, an outlet port, and an exhaust port, said housing defining a bore communicating with said inlet, outlet and exhaust ports, a valve operating plunger slidably mounted in said bore and having larger and smaller diameter portions defining a shoulder therebetween, a valve seating surface on said housing, a circumferentially extending groove on said shoulder, a circumferentially extending cavity in said plunger communicating with said groove, a circumferentially extending seal including a main body portion received in said cavity and a circumferentially extending bead projecting from said body portion of the seal through said groove for sealing engagement with the valve seating surface when the shoulder on the plunger is urged thereagainst to thereby seal off the exhaust from the inlet and outlet ports, said plunger being movable to a position disposing the shoulder on the plunger away from the valve seating surface to thereby break the sealing engagement between the latter and said bead so that the exhaust port is thereby communicated with the outlet port.

2. Control valve as claimed in claim 1, wherein said plunger defines a sealing surface adjacent said cavity and said seal includes a second bead projecting from said body portion for engaging with said sealing surface, said second bead deflecting from said sealing surface to vent pressure from said cavity when the shoulder on the plunger is moved away from the valve seating surface to thereby prevent fluid pressure from forcing said seal from said cavity.

3. Control valve as claimed in claim 2, wherein said sealing surface is defined on a plane substantially parallel to a plane defining said valve seating surface, whereby said second bead is forced into sealing engagement with said valve seating surface, both of said beads are compressed against their corresponding surfaces.

4. Control valve as claimed in claim 3, wherein said seal is made of an elastic material, and the body portion of the seal is maintained in said cavity by the elasticity of the seal.

5. Control valve as claimed in claim 1, wherein said seal is made of an elastic material, and the body portion of the seal is maintained in said cavity by the elasticity of the seal.

6. Control valve as claimed in claim 5, wherein said seal and said plunger include cooperating means to vent the pressure from said cavity when the pressure level on said plunger is reduced to prevent fluid pressure in said cavity from forcing the seal therefrom.

7. Control valve as claimed in claim 6, wherein said cooperating means includes a second bead on said body of the seal which cooperates with a sealing surface on said plunger.

8. Control valve comprising a housing defining a bore therewithin, said housing having an inlet port for communication with a fluid pressure source, an outlet port, and an exhaust port, each of said ports communicating with said bore, said bore being stepped to define larger and smaller diameter portions with a shoulder therebetween, a stepped plunger slidably mounted in said bore having larger and smaller diameter portions therebetween, said shoulder of said housing and said shoulder on said bore having cooperative sealing means to control communication from said bore to said exhaust port, said plunger being movable from a first position disengaging said cooperative sealing means to permit communication to the exhaust port from the outlet port to a second condition closing said exhaust port and communicating the inlet and outlet ports, said smaller portion of the plunger being sealingly received in the smaller portion of the bore, said inlet port communicating with said smaller portion of the bore, said plunger carrying a passage extending therethrough and communicating with the inlet port, said passage communicating with said larger portion of the bore when the plunger is disposed in said second position but being sealed off from said bore when the plunger is moved to the first position, said sealing means including a valve seating surface on the shoulder of said bore, a groove on said plunger, and a seal made from an elastic material and having a body portion received in said groove, said seal being maintained in said groove by the elasticity of said seal, said seal including a portion projecting from said groove for engagement with said valve seating surface.

9. Control valve as claimed in claim 8, wherein said seal and said plunger include cooperating means to vent the pressure from said groove when the pressure level on said plunger is reduced to prevent fluid pressure in said cavity from forcing the seal therefrom.

10. Control valve as claimed in claim 9, wherein said cooperating means includes a second bead on said body of the seal which cooperates with a sealing surface on said plunger.

11. Control valve as claimed in claim 8, wherein said groove is a circumferentially extending groove circumscribing said plunger, a portion of said groove being open to provide a circumferentially extending opening transverse to said plunger, said valve seating surface forcing said opening, said seal including a body portion received in said groove and a bead extending from said body portion for sealing engagement with said valve seating surface when the plunger is disposed in said second condition.

12. Control valve comprising a housing defining a bore therewithin, said housing having an inlet port for communication with a fluid pressure source, an outlet port, and an exhaust port, each of said ports communicating with said bore, a plunger slidably mounted in said bore and movable therein from a first condition venting said outlet port to said exhaust port to a second condition closing said exhaust port and communicating said inlet and outlet ports, and sealing means carried by said housing and said plunger for closing communication to said exhaust port when the plunger is in said second condition, said sealing means including a groove on said plunger, a seal made from an elastic material and having a body portion received in said groove, said seal being maintained in said groove by the elasticity of said seal, said seal including a portion projecting from said groove for engagement with a valve seating surface on said housing, said seal and said plunger including cooperating means to vent the pressure from said groove when the pressure level on said plunger is reduced to prevent fluid pressure in said cavity from forcing the seal therefrom.

13. Control valve as claimed in claim 12, wherein said cooperating means includes a second bead on said body of the seal which cooperates with a sealing surface on said plunger.

14. Control valve comprising a housing defining a bore therewithin, said housing having an inlet port for communication with a fluid pressure source, an oulet port, and an exhaust port, each of said ports communicating with said bore, a plunger slidably mounted in said bore and movable therein from a first condition venting said oulet port to said exhaust port to a second condition closing said exhuast port and communicating said inlet and outlet ports, and sealing means carried by said housing and said plunger for closing communication to said exhaust port when the plunger is in said second condition, said sealing means including a groove on said plunger, a seal made from an elastic material and having a body portion received in said groove, said seal being maintained in said groove by the elasticity of said seal, said seal including a portion projecting from said groove for engagement with a valve seating surface on said housing, said plunger defining a sealing surface adjacent said groove, said seal including a second bead projecting from said body portion for engaging with said sealing surface, said second bead deflecting from said sealing surface to vent pressure from said groove when the shoulder on the plunger is moved away from the valve seating surface to thereby prevent fluid pressure from forcing said seal from said groove.

* * * * *